United States Patent [19]
Bischoff et al.

[11] Patent Number: 5,237,476
[45] Date of Patent: Aug. 17, 1993

[54] THIN FILM TAPE HEAD ASSEMBLY

[75] Inventors: Peter G. Bischoff, Cupertino; Carroll S. Gooden; Chak M. Leung, both of San Jose, all of Calif.

[73] Assignee: Read-Rite Corp., Milpitas, Calif.

[21] Appl. No.: 705,754

[22] Filed: May 28, 1991

[51] Int. Cl.$^5$ .......................... G11B 5/29; G11B 5/31; G11B 5/187

[52] U.S. Cl. ................................ 360/126; 360/121; 360/122; 360/125

[58] Field of Search ................. 360/126, 125, 122, 121

[56] References Cited

U.S. PATENT DOCUMENTS 4,967,300 10/1990 Reid et al. ............................ 360/122
4,991,046 2/1991 Adamson et al. ................... 360/122

FOREIGN PATENT DOCUMENTS 64-49113 4/1979 Japan ................................... 360/125
60-258713 12/1985 Japan ................................... 360/122

OTHER PUBLICATIONS

J. E. Schaps, "Magnetic Head." *IBM Technical Disclosure Bulletin*, vol. 13, No. 8 (Jan. 1971) p. 2362.

*Primary Examiner*—Constantine Hannaher
*Attorney, Agent, or Firm*—Nathan N. Kallman

[57] ABSTRACT

A thin film tape head assembly is formed by depositing a multiplicity of thin film transducers on a ceramic wafer or substrate. The wafer is divided into head bars, each of which has one or more thin film transducers on its face. End sections and a cover bar are joined to the head bar to form a head bar subassembly. A flexible cable or electrical pins are provided between the end sections to enable electrical connection between the head circuit and external circuitry. By joining a number of head bar subassemblies, a multigap thin film tape head assembly is produced to serve as a read/write device.

13 Claims, 6 Drawing Sheets

THIN FILM TAPE HEAD ASSEMBLY

FIELD OF THE INVENTION

This invention relates to a tape head assembly formed with thin film heads.

DESCRIPTION OF THE PRIOR ART

Early prior art magnetic tape heads were made with thin laminations of a magnetic alloy material. For transducing operation with multiple channels, the tape heads had multiple transducing gaps and nonmagnetic separators and required extensive assembly. The multigap tape heads were relatively large and expensive to make.

Subsequently, multigap heads were configured and contoured from ferrite material. These heads were more compact and had good magnetic characteristics for high frequency data signal recording. The multigap tape heads were still relatively large, expensive to make and adjacent gaps were separated by a large number of data tracks. The weight of the bulky tape head consumes considerable power during track servoing. Ferrite technology is characterized by substantial adjacent gap misalignment in a multi-channel tape head such that simultaneous recording of multiple gaps in parallel channels is severely restricted. Nevertheless, the tendency is to make components of data processing systems, such as magnetic heads smaller and more compact and with improved data signal processing capability. To this end, thin film heads have been developed primarily for use in disk drives. Such thin film heads for disk drives comprise thin film transducers deposited on air bearing sliders. Thin film heads are considerably smaller and have very narrow transducing gaps thereby allowing processing of high density data signals. It would be highly desirable to use thin film transducers with a tape head assembly, particularly as a multigap read/write device because adjacent gaps in a multi-channel tape head are fabricated from the same wafer which is made to be very flat. The small device geometry of a thin film tape head allows many devices to be precisely fabricated on the same wafer by semiconductor technology, thereby lowering cost and increasing accuracy. The small separation between adjacent devices allows fewer tracks in between thus reducing track access time. The overall size of a thin film tape head is greatly reduced thus enabling lower power consumption during track servoing.

SUMMARY OF THE INVENTION

An object of this invention is to provide a relatively compact tape head assembly using thin film heads.

Another object of this invention is to provide a method of making a tape head assembly having a design that allows the maximum use of the area of a wafer from which read/write devices are made.

Another object is to provide a thin film tape head assembly which is relatively easy and inexpensive to produce.

A further object is to provide a read/write device having multiple thin film heads for coaction with multiple data tracks registered on a magnetic tape.

Another object is to provide a tape head having low wear characteristics.

According to this invention, a thin film tape head assembly is made with thin film transducers which are deposited on a ceramic wafer or substrate. The wafer is divided into head blocks or head bars, each having a plurality of thin film transducers aligned thereon. Substantially the entire surface of the wafer is dedicated to forming the active components of the thin film transducers. A head bar is bonded to a cover bar to complete a head bar assembly. Subsequently, this structure is joined into a carrier assembly, which comprises the head bar assembly, a carrier plate, a flexible cable and end sections or end caps. The flexible cable or pin array provides the electrical connection from the thin film transducers to external read/write circuitry. The carrier assembly is configured for providing a specific function, such as read, write, erase or a servo format. A typical tape head comprises one or more multiple carrier assemblies that are accurately fixtured and epoxy bonded together to effectuate a sturdy and stable structure which serves as a multigap thin film tape head assembly. The tape head assembly is capable of processing high frequency data along closely spaced parallel data tracks.

BRIEF DESCRIPTION OF THE DRAWING

The invention will be described in detail with reference to the drawing in which.

DETAILED DESCRIPTION OF THE PREFERRED EMBODIMENT

Figure 1:
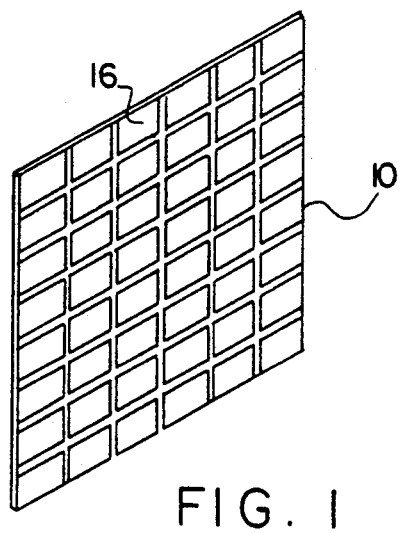
FIG. 1 is a representational plan view of a wafer partitioned into head bars by slicing, showing thin film transducers deposited thereon.
Figure 2:
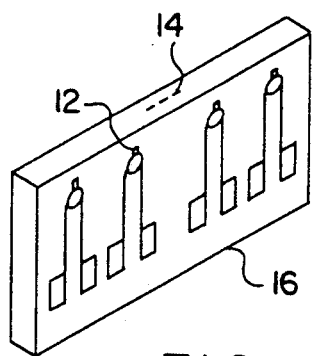
FIG. 2 is an isometric view depicting a single head bar on which four transducers are deposited.
Figure 3:
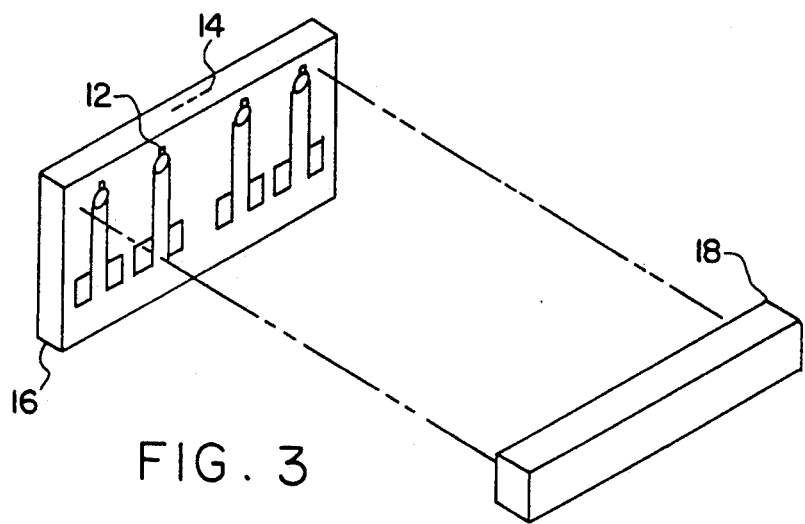
FIG. 3 is an exploded view showing a head bar and cover bar, as implemented in this invention.

With reference to FIGS. 1 and 2, a square or rectangular wafer 10 has a multiplicity of thin film transducers or heads 12 deposited thereon. The thin film heads 12 are formed using well known masking and deposition processes, wherein successive layers, including pole pieces and electrical coils, are deposited on the wafer. An alumina coating is deposited over the thin film heads to provide insulation and protection. The wafer 10, which is made of ceramic material such as $Al_2O_3$-TiC, is cut and divided into head blocks or head bars 16 by means of ganged diamond saws for example. Each head bar 16 supports a number of thin film heads 12, four heads, by way of example, as shown in FIG. 2. A cover bar 18 is provided to cover the face of the head bar 16 on which the thin film heads 12 are deposited (see FIG. 3). Each head bar 16 is contoured and lapped at its top surface. The overall size of the head bar 16 is only as large as is necessary to contain all the components required for the read/write functions and for lapping transducers. In this way, maximum use of the wafer material is made for producing the head bars 16 including the operable read/write elements which are used with the thin film head assembly of this invention.

In an embodiment of this invention, each head bar 16 is joined at its end by an adhesive to end caps or sections 20a, 20b, which provide a support or carrier for the head bar 16. The head bar 16 and end caps 20a, 20b are preferably made from the same ceramic material so that the coefficient of thermal expansion of the parts are matched. The assembly of the head bar 16 and end caps 20a, 20b is accomplished by means of an alignment tool so that the top surface of the head bar is substantially in precise alignment with the top surfaces of the end caps, and the rear surfaces with the top surfaces of the end caps are aligned with the rear and front surfaces of the head bar structure respectively. The front surfaces of the end caps 20a, 20b provide a mating surface for an adjacent head bar subassembly or for another component of the final tape head assembly, as shown in FIG. 7.

Figure 4:
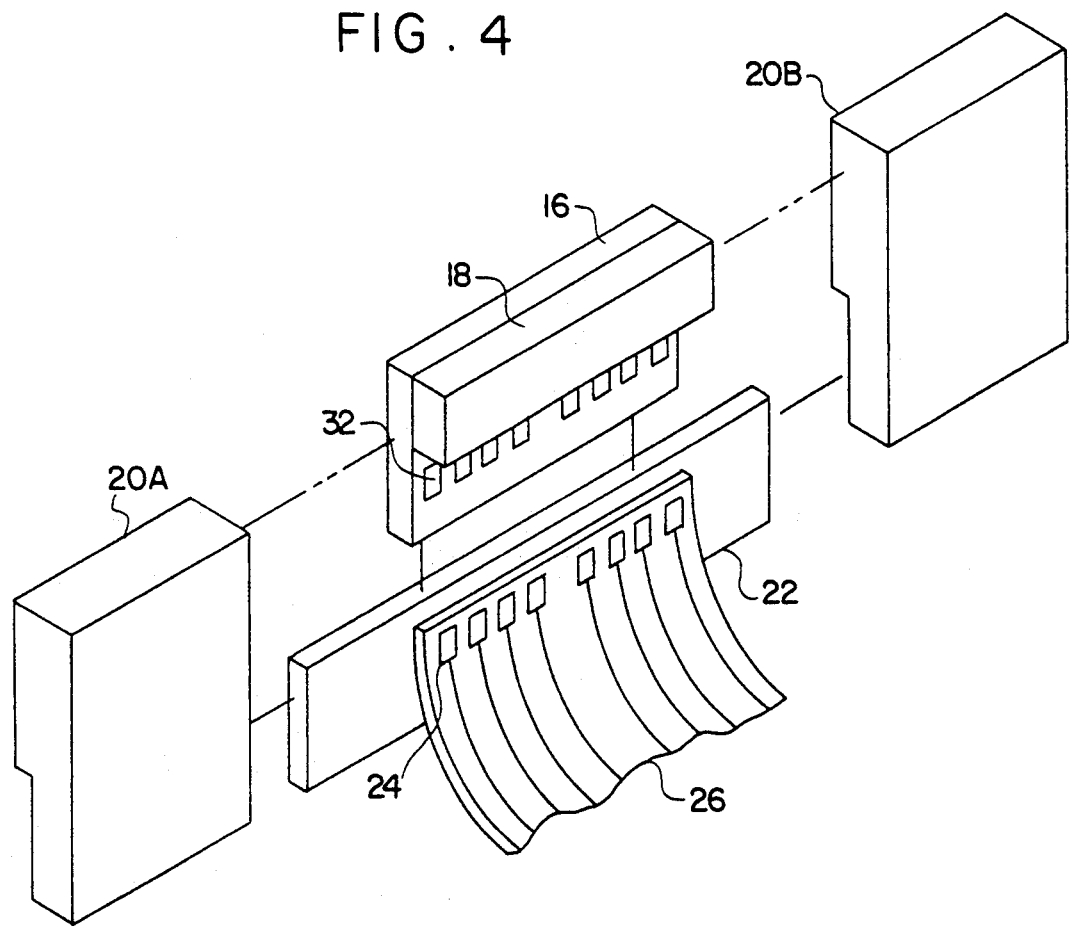
FIG. 4 is an exploded view showing a head bar subassembly comprising a head bar that is disposed between end sections or caps and an electrical cable connection.
Figure 5:
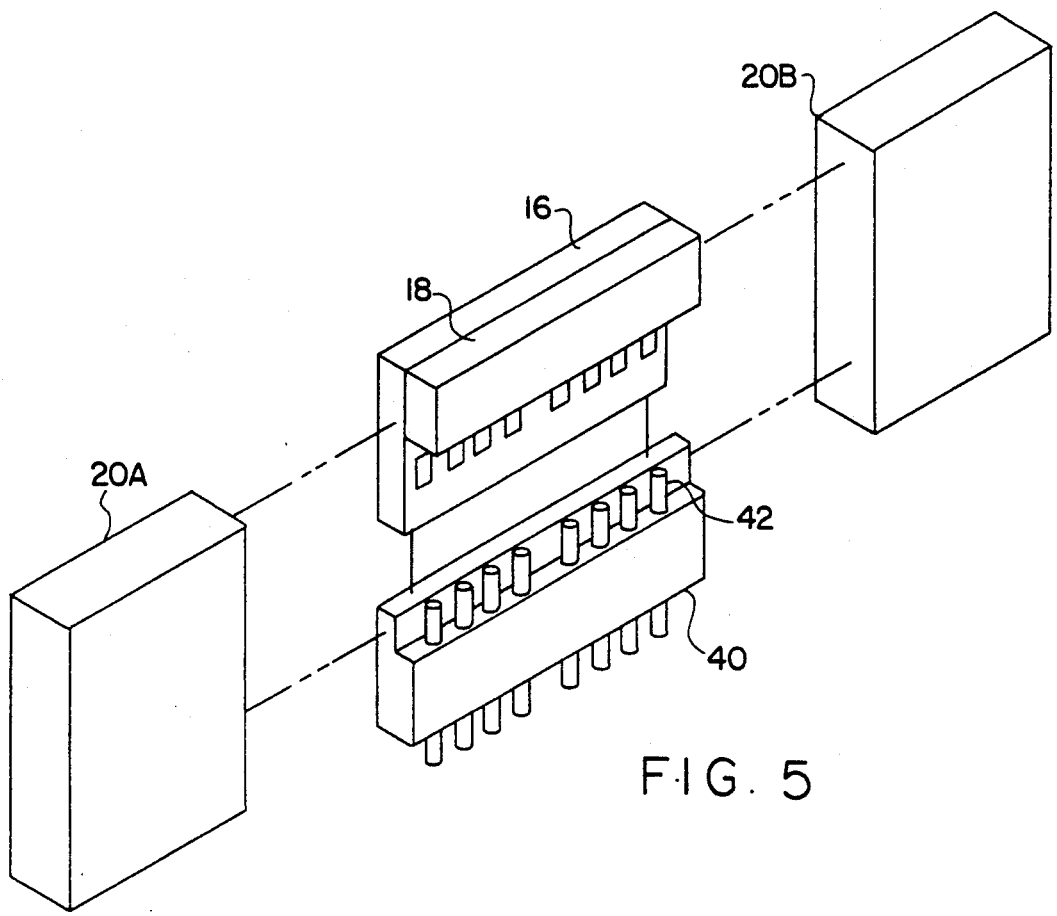
FIG. 5 depicts a head bar joined to a cover bar, the end sections and a pin carrier plate to provide electrical connection to external circuitry.
Figure 6:
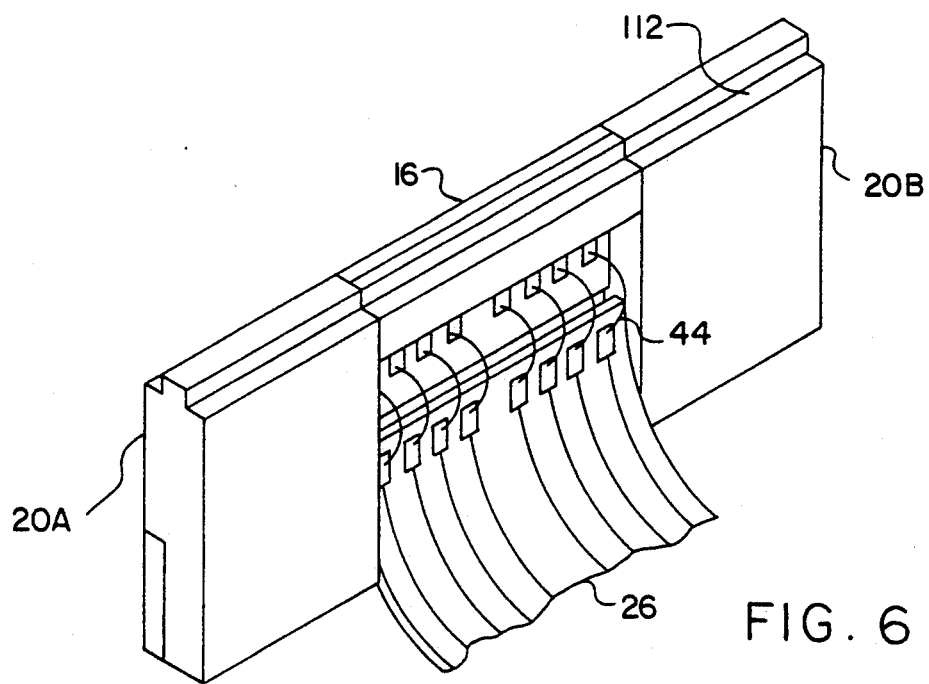
FIG. 6 illustrates a full assembly of a head carrier with a profiled top made in accordance with this invention.

To enable electrical connection from the tape head assembly to external circuitry, a flexible cable 26 is joined to a carrier plate 22, as shown in FIGS. 4 and 6, so that bond pads 32 on the head bar 16 can be wired to bond pads 24 on the flexible cable 26, thus connecting the thin film devices into the read/write circuitry of the tape drive. Alternatively, a pin carrier plate 40, on which conducting metal pins are supported, is joined to the end caps and head bar, as shown in FIG. 5.

Figure 7:
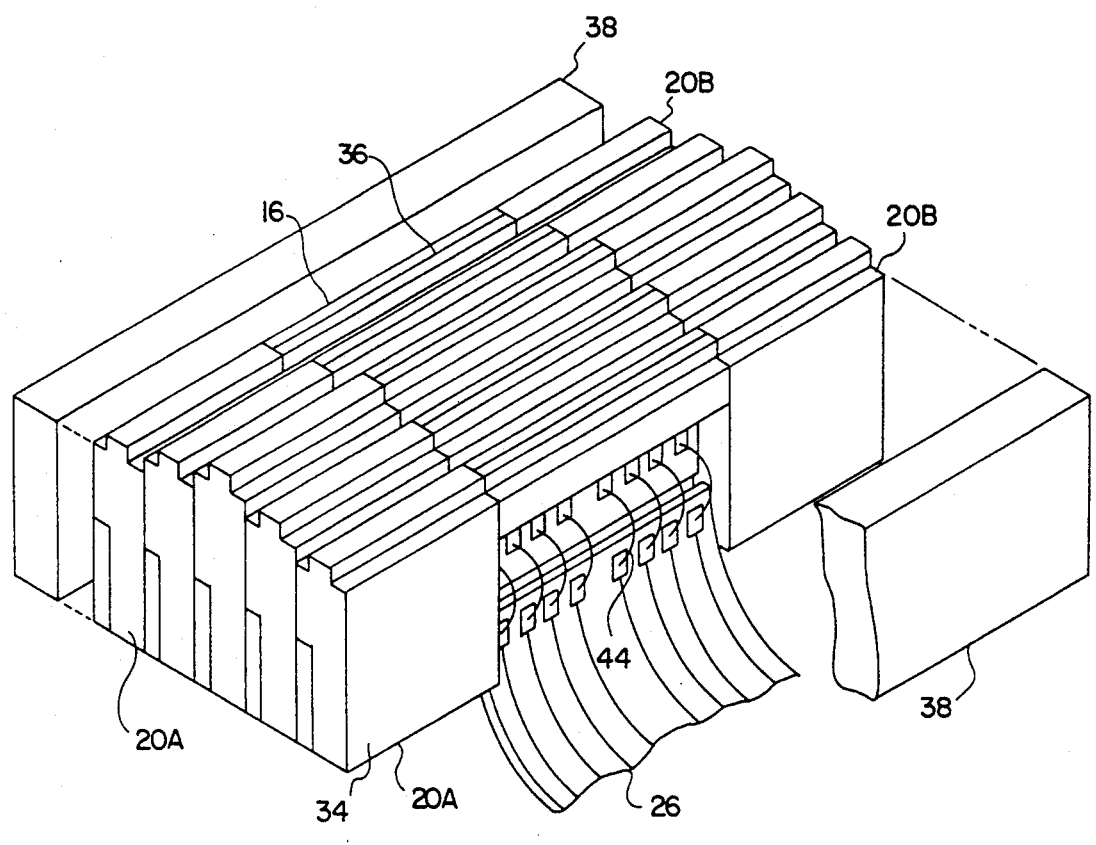
FIG. 7 is an isometric view of a contoured multiple head carrier subassembly formed by joining head bar subassemblies having components as shown in FIG. 4.

A number of head bars 16 corresponding to specific read and write requirements of the thin film tape head product are joined, by an epoxy adhesive, to form a multi-element read/write device as shown in FIG. 7. During production, multiple head bars are successively assembled using a vernier design on the mask to produce a visual set of alignment marks or verniers 14, as shown in FIG. 2, on the top surface of the tap heads across which the tape travels. By use of the alignment marks, the transducing gaps of adjacent head bar subassemblies are accurately aligned, on the order of about two microns, during assembly of the read/write device. Nonmagnetic end pieces 38 are attached to the exposed surfaces of the outer head bar subassemblies 34 to enable assembly of the read/write multi-element device 36 into a head mount.

Figure 8:
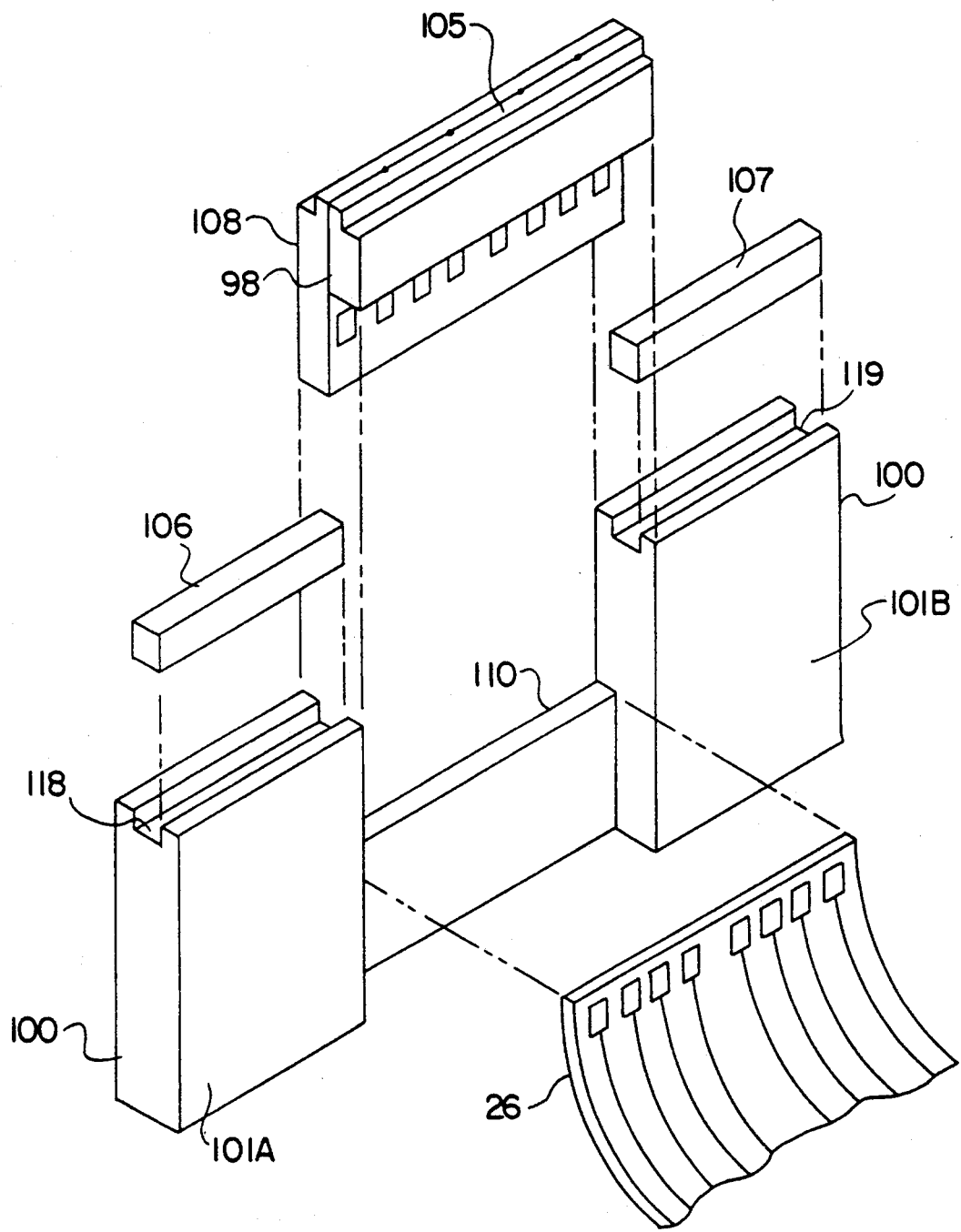
FIG. 8 is an isometric exploded view of an alternative embodiment of the novel tape head assembly disclosed herein.
Figure 9:
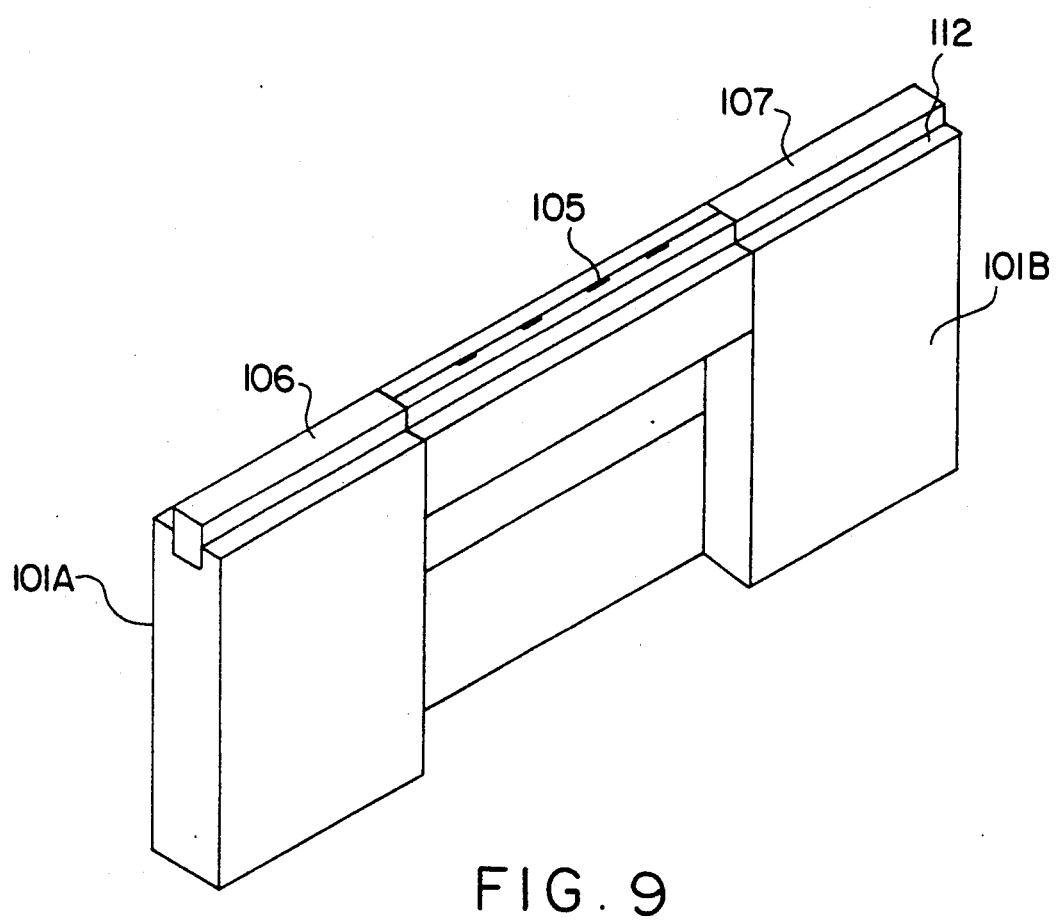
FIG. 9 is an isometric view of an assembled tape head assembly of the embodiment illustrated in FIG. 8.

An alternative embodiment of the invention is illustrated in FIGS. 8 and 9 wherein the end sections 101a and 101b and an interconnecting part 110, which connects the end sections 101a and 101b, are made as a single piece 100. The piece 100 is preferably made from calcium titanate or nickel zinc. During assembly of the thin film tape head, the head bar 108 on which the transducers are disposed is partially lapped and then bonded to a cover bar 98. Top surface blocks 106 and 107 are seated in grooves 118 and 119 respectively provided in the end sections 101a and 101b. The top surface blocks 106 and 107 are made of a similar material as the substrate of the thin film head assembly, which may be aluminum oxide-titanium carbide, for example. The top surface blocks 106 and 107 are positioned, as illustrated in FIG. 9 so that the surfaces 105, 106 and 107 are substantially in the same plane. The surface pieces 106 and 107 and the head bar carrier 108 are thus bonded together, by epoxy adhesive for example, in a tight fitting close relationship. The resultant continuous surface, comprising surfaces 105, 106 and 107, is finish lapped to specification. Electrical lapping guides which are formed on said head bars are used for lapping the tape-engaging surfaces of the head bar subassemblies. To provide the necessary electrical connection between the head read/write circuit and external circuitry, a flexible cable 26 with bond pads is attached to the interconnecting part 110 between the end sections 101a and 101b. The cable bond pads are electrically wired to bond pads formed with the head bar subassembly. Finally, bleed slots 112 are cut into the parts 106, 107 and 108 so that during operation of a tape apparatus, the magnetic tape makes contact with the recording devices for transducing relation with the head gaps located at the top of the thin film tape head assembly.

By virtue of the design of the thin film tape head assembly disclosed herein, a maximum number of head bar units can be obtained from a wafer. The relatively small dimensions of the thin film transducers allow close spacing of the transducers and their transducing gaps so that parallel data tracks registered on the tape can be closely spaced accordingly with resultant fast track access times. The short transducing gaps of the thin film heads enables high frequency data processing and high density signal recording. Head bars having more than three thin film transducers can be used for processing data on multiple tracks, such as eight parallel tracks for example, on which bytes of data can be recorded and read out. The heads can be employed as read or write elements and can be either inductive or magnetoresistive (MR) heads or a combination of both types. If an MR head is used, a bias circuit which is formed on the head bar is easily connected to the flexible cable circuit and to the current supply of the tape drive. It is apparent that various number and types of head elements can be used to form the compact thin film tape head assembly of this invention. It should be understood that other variations and modifications can be made within the spirit and scope of this invention.

What is claimed is:

1. A thin film tape head assembly comprising:
   a head bar having opposing ends and a top surface between said ends and having at least one thin film head formed on the face of said head bar, said thin film head having a transducing gap disposed at the top surface of said head bar;
   a plurality of end caps joined to said opposing ends of said head bar for supporting said head bar for forming a head bar subassembly including
   a cover bar attached to the face of said head bar for covering the face of said head bar and said thin film head, including longitudinal grooves formed in said end caps, and rectangular surface blocks seated in said grooves, said head bar and said cover bar being joined to said surface blocks.

2. A thin film tape head assembly as in claim 1, including a connecting plate disposed between said end caps.

3. A thin film tape head assembly as in claim 1, including bond pads formed with said head bar subassembly, and a flexible electrical cable or pins connected to said bond pads for accessing external circuitry.

4. A thin film tape head assembly as in claim 1, wherein said head bar and said end caps are made of a ceramic material.

5. A thin film tape head assembly as in claim 4, wherein said ceramic material is aluminum oxide-titanium carbide.

6. A thin film tape head assembly as in claim 1, including bleed slots formed along the top surfaces of said head bar subassembly, said bleed slots surrounding said transducing gap.

7. A thin film tape head assembly as in claim 1, comprising a multiplicity of joined head bar subassemblies, said joined head bar subassemblies having a lapped and contoured configuration over which a magnetic tape is moved.

8. A thin film tape head assembly as in claim 1, wherein said head bar subassembly comprises at least one inductive or magnetoresistive head.

9. A thin film tape head assembly as in claim 1, wherein said end caps are joined to opposing ends of said head bar by an adhesive.

10. A thin film tape head assembly as in claim 1, including lapping guide means formed on said head bar.

11. A thin film tape head assembly as in claim 1, including an interconnecting part, wherein said end caps and said interconnecting part are fabricated as an internal structure.

12. A thin film tape head assembly as in claim 11, wherein said integral structure is made of calcium titanate or nickel zinc.

13. A thin film tape head assembly as in claim 1, including vernier indicators located on said head bar.

* * * * *